US011432183B1

(12) United States Patent
Marupaduga et al.

(10) Patent No.: US 11,432,183 B1
(45) Date of Patent: Aug. 30, 2022

(54) SUPPRESSION OF CARRIER-AGGREGATION SERVICE BY FIRST ACCESS NODE IN RESPONSE TO BACKHAUL CONSTRAINT OF SECOND ACCESS NODE

(71) Applicant: Sprint Spectrum L.P., Overland Park, KS (US)

(72) Inventors: Sreekar Marupaduga, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 138 days.

(21) Appl. No.: 16/887,914

(22) Filed: May 29, 2020

(51) Int. Cl.
*H04W 28/08* (2009.01)
*H04W 28/02* (2009.01)
*H04W 76/15* (2018.01)

(52) U.S. Cl.
CPC ... *H04W 28/0252* (2013.01); *H04W 28/0284* (2013.01); *H04W 28/0289* (2013.01); *H04W 76/15* (2018.02)

(58) Field of Classification Search
CPC ............. H04W 28/0252; H04W 76/15; H04W 28/0284; H04W 28/0289
See application file for complete search history.

(56) References Cited

U.S. PATENT DOCUMENTS

| 8,681,601 | B1* | 3/2014 | Dalvi | H04L 41/0668 370/216 |
|---|---|---|---|---|
| 10,051,511 | B1* | 8/2018 | Mehta | H04W 28/0284 |
| 10,548,141 | B1* | 1/2020 | Marupaduga | H04L 5/0032 |
| 11,064,425 | B1* | 7/2021 | Cui | H04W 48/18 |
| 11,197,259 | B2* | 12/2021 | Rune | H04W 60/005 |
| 2012/0238308 | A1* | 9/2012 | Brunel | H04W 16/02 455/517 |
| 2013/0072212 | A1* | 3/2013 | Nakamura | H04W 28/0247 455/452.1 |
| 2014/0321282 | A1* | 10/2014 | Pragada | H04W 28/10 370/235 |

(Continued)

FOREIGN PATENT DOCUMENTS

WO  WO 2017/097349  6/2017

*Primary Examiner* — Parth Patel

(57) ABSTRACT

A method and system to control carrier aggregation in a wireless communication system including a first access node and a second access node, where the first access node has a first respective backhaul connection, where the second access node has a second respective backhaul connection, where the first access node supports serving user equipment devices (UEs) with standalone connectivity, and where the first and second access nodes cooperatively support serving UEs with dual connectivity. A method includes detecting that the second respective backhaul connection of the second access node is threshold heavily loaded. And the method includes, based at least in part on the detecting that the second respective backhaul connection of the second access node is threshold heavily loaded, causing the first access node to suppress an extent of carrier-aggregation service that the first access node will provide to any standalone-connected UEs, to help free up capacity for dual-connectivity service.

19 Claims, 4 Drawing Sheets

(56) References Cited

U.S. PATENT DOCUMENTS

| | | | |
|---|---|---|---|
| 2015/0124616 A1* | 5/2015 | Lohman | H04L 43/0894 370/235 |
| 2016/0212790 A1* | 7/2016 | Fujishiro | H04W 92/20 |
| 2017/0118672 A1* | 4/2017 | Zhang | H04W 28/0289 |
| 2017/0265175 A1* | 9/2017 | Gandhi | H04W 76/20 |
| 2017/0303286 A1* | 10/2017 | Sang | H04W 72/0413 |
| 2018/0176920 A1* | 6/2018 | Dong | H04W 16/28 |
| 2018/0343567 A1* | 11/2018 | Ashrafi | H04L 41/0816 |
| 2018/0351652 A1* | 12/2018 | Ashrafi | H04L 41/142 |
| 2019/0053115 A1* | 2/2019 | Ngai | H04W 72/0493 |
| 2019/0074954 A1* | 3/2019 | Sevilla R | H04W 72/0453 |
| 2019/0357095 A1* | 11/2019 | Pakniat | H04W 36/0094 |
| 2019/0394672 A1* | 12/2019 | Mukherjee | H04L 47/11 |
| 2020/0045583 A1* | 2/2020 | Kim | H04W 28/08 |
| 2020/0100124 A1* | 3/2020 | Hampel | H04B 7/15528 |
| 2020/0100309 A1* | 3/2020 | Jha | H04W 48/18 |
| 2020/0245186 A1* | 7/2020 | Chen | H04W 28/0278 |
| 2020/0314764 A1* | 10/2020 | Noh | H04W 52/146 |
| 2020/0351645 A1* | 11/2020 | Jin | H04W 76/30 |
| 2021/0050955 A1* | 2/2021 | Park | H04B 7/0456 |
| 2021/0084714 A1* | 3/2021 | Agarwal | H04W 36/0066 |
| 2021/0135727 A1* | 5/2021 | Balasubramanian | H04B 7/0632 |
| 2021/0167987 A1* | 6/2021 | Saltsidis | H04L 12/2867 |
| 2021/0243104 A1* | 8/2021 | Parmer | H04L 43/50 |
| 2021/0243590 A1* | 8/2021 | Jin | H04W 8/245 |
| 2021/0250825 A1* | 8/2021 | Purkayastha | H04W 80/02 |
| 2021/0266815 A1* | 8/2021 | Wei | H04W 92/24 |
| 2021/0267000 A1* | 8/2021 | Jain | H04W 48/18 |
| 2021/0274512 A1* | 9/2021 | Bisaria | H04W 48/18 |
| 2021/0282077 A1* | 9/2021 | Wei | H04W 48/16 |
| 2021/0282126 A1* | 9/2021 | Lekutai | H04W 72/10 |
| 2021/0314818 A1* | 10/2021 | Youtz | H04W 36/36 |
| 2021/0345204 A1* | 11/2021 | Matolia | H04W 36/00837 |
| 2021/0368574 A1* | 11/2021 | Jonsson | H04W 76/00 |
| 2021/0377801 A1* | 12/2021 | Noriega | H04W 88/16 |
| 2021/0378041 A1* | 12/2021 | Narasimha | H04W 40/24 |
| 2022/0022167 A1* | 1/2022 | Jha | H04W 72/0446 |

\* cited by examiner

SUPPRESSION OF CARRIER-AGGREGATION SERVICE BY FIRST ACCESS NODE IN RESPONSE TO BACKHAUL CONSTRAINT OF SECOND ACCESS NODE

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. Each such frequency channel could be characterized by a center frequency and particular bandwidth (width of frequency) centered on that center frequency and thus ranging from a low-end frequency to a high-end frequency.

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each spanning a respective symbol time segment and occupying a particular subcarrier, and the subcarrier of each resource element could be modulated to carry data. Further, in each subframe or other transmission time interval (TTI), the resource elements on the downlink and uplink of the example air interface could be grouped to define physical resource blocks (PRBs) that could be allocated as needed to carry data between the access node and served UEs.

Depending on the carrier bandwidth and configuration of these PRBs, each subframe might thereby define a certain number of these PRBs. For instance, in a representative arrangement, a channel bandwidth of 100 Megahertz (MHz) might define 50 PRBs per subframe, and a channel bandwidth of 20 MHz might define 100 PRBs per subframe.

In addition, certain resources on the downlink and/or uplink of each such cell could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of one or more user-plane bearers, each including an access bearer that extends between the access node and a core-network gateway system providing connectivity with a transport network and each including a data-radio-bearer (DRB) that extends over the air between the access node and the UE.

Once the UE is connected and attached, the access node could then serve the UE with packet-data communications.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in the downlink control channel of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE, in the downlink channel of a preceding subframe, a DCI message that designates those upcoming PRBs. And the UE could then accordingly transmit the transport block to the access node in the designated PRBs, and the access node could forward the data to the core-network gateway.

When the industry advances from one generation of wireless technology to the next, or in other scenarios, networks and UEs may also support dual-connectivity service, where a UE is served on co-existing connections according to multiple different RATs.

For instance, a cell site could be equipped with one access node that provides coverage and service according to a first RAT ("first-RAT access node") and another access node that provides overlapping coverage and service according to a second RAT ("second-RAT access node"), and a UE positioned within coverage of the access nodes could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual connectivity (or "non-standalone" connectivity) could help facilitate increased peak data-rate of communications, by multiplexing the UE's communications across the multiple air-interface connections. Further or alternatively, dual connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

For instance, the MN could direct the UE to scan for secondary coverage under the second RAT, possibly identifying the SN and associated carriers for which the UE should scan, and could receive in response from the UE a report that the UE detected threshold strong coverage of the SN. And the MN could then coordinate setup of dual-connectivity service, with the UE being served by the MN and the SN.

While the specifics of setting up dual connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

With dual connectivity established, the MN and SN could then concurrently serve the UE over their respective connections with the UE, perhaps with both providing for both downlink and uplink downlink scheduled data communication, or perhaps with both providing for downlink scheduled data communication but just the one of the access nodes providing for uplink scheduled data communication.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, on the uplink, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just one of the access nodes.

In addition, when a UE is so served by an access node according to a given RAT, regardless of whether the service is standalone on that RAT or is part of dual connectivity on that RAT together with another RAT, the access node may also configure carrier-aggregation service of the UE on that RAT. Carrier-aggregation service of a UE on a given RAT involves service of the UE concurrently on an aggregation of multiple carriers according to the RAT.

To configure carrier-aggregation service for a UE when the UE is connected with an access node on a given carrier, the access node could add one or more carriers to the UE's air-interface connection. For instance, the access node could update a context record for the UE's connection to indicate the multiple carriers, and the access node could transmit to the UE a signaling message that lists the multiple carriers, so that the UE can be prepared to operate on those multiple carriers.

With carrier-aggregation configured, the access node could then coordinate communications with the UE on PRBs distributed across the multiple carriers in the UE's connection. For instance, when the access node has data to transmit to the UE, the access node could schedule and provide transmission of data to the UE in downlink PRBs distributed across the multiple carriers in a given subframe. And if uplink carrier aggregation is supported, then when the UE has data to transmit to the access node, the access node could schedule and the UE could provide transmission of the data to the access node in uplink PRBs distributed across the multiple carriers in a given subframe.

One technical problem that could arise in a system when a UE is served with dual connectivity is that the backhaul connection through which at least one of the UE's serving access nodes communicates on the core network can become threshold heavily loaded, to a point where the backhaul connection becomes a bottleneck for data communication, possibly resulting in data loss and/or other issues. This bottleneck problem could arise if the access node's backhaul connection has limited physical or configured capacity and the aggregate data flow over that connection reaches that limit. By way of example, the problem could arise in a scenario where the access node communicates on the core network through a cell-site router port that has limited capacity and when the access node engages in extensive user-plane and/or control-plane signaling through that port.

This backhaul problem could be especially troubling for a dual-connected UE, as a user of a dual-connected UE may expect, and perhaps pay for, the UE to be served with a relatively high data rate in aggregate across the UE's multiple connections.

The present disclosure provides a mechanism to help address this problem in network having first and second access nodes, where the first and second access nodes have separate respective backhaul connections, where the first access node supports serving UEs with standalone connectivity, and where the first and second access nodes cooperatively support serving UEs with dual connectivity—with the first access node being the MN and the second access node being the SN, or vice versa.

In accordance with the disclosure, when the first and second access nodes are cooperatively serving at least one UE with dual connectivity, a computing system will determine when the second access node's respective backhaul connection becomes threshold heavily loaded. And based at least in part on that determination, the computing system will then cause the first access node to suppress the extent of carrier-aggregation service that the first access node will provide to any standalone-connected UEs.

Optimally, suppressing the extent of carrier-aggregation service that the first access node will provide to any standalone-connected UEs could help to control the level of load on the first access node's backhaul connection, as less carrier-aggregation service by the first access node may result in less user-plane data flow over the first access node's backhaul connection. And controlling the level of load on the first access node's backhaul connection may thereby allow the first access node to better support the dual-connectivity service of the at least one UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system having a cell site that includes multiple access nodes sharing a common cell-site router for communicating on a core network. In particular, the disclosure will address a system where such a cell site includes both a 4G LTE access node (4G evolved Node-B (eNB)) and a 5G NR access node (5G next generation Node-B (gNB)) and supports 4G-5G dual connectivity, referred to as EUTRA-NR Dual Connectivity (EN-DC). It should be understood, however, that the principles disclosed herein could extend to apply with respect to other scenarios as well, such as with respect to other RATs, other forms of dual connectivity, and other cell site configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
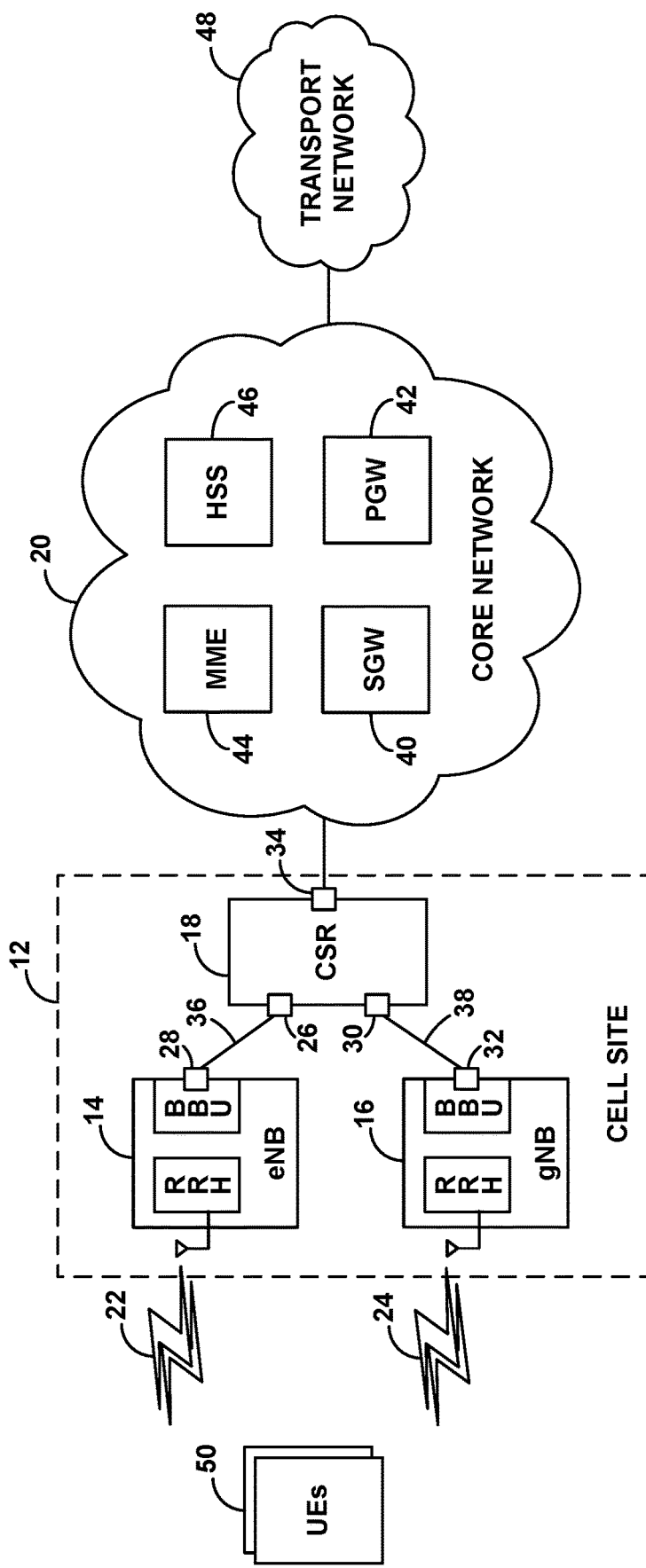
FIG. 1 is a simplified block diagram of an example network arrangement in which aspects of the present disclosure can be implemented.

FIG. 1 is a simplified block diagram depicting a representative arrangement including a cell site 12 having a 4G eNB 14 and a 5G gNB 16, and having a cell site router (CSR) 18 that provides backhaul connectivity between the example access nodes 14, 16 and a core network 20.

Access nodes 14, 16 could each be a macro access node of the type configured to provide a wide range of coverage or could take other forms, such as a small cell access node, repeater, a femtocell access node, or the like, possibly configured to provide a smaller range of coverage. Further, the two access nodes could be configured to provide coverage in largely the same direction as each other, to define an area in which UEs can engage in both 4G service provided by the 4G eNB 14 and 5G service provided by the 5G gNB 16.

Each access node could be configured to provide coverage and service on multiple respective carriers. Namely, the 4G eNB 14 could provide coverage and service on multiple 4G carriers 22, and the 5G gNB 16 could provide coverage and service on multiple 5G carriers 24. In representative 4G and 5G implementations, each such carrier could be FDD or TDD and could thus define separate downlink and uplink frequency channels or a single frequency channel multiplexed over time between downlink and uplink use. And as noted above, each such frequency channel could be characterized by its center frequency and bandwidth.

Further, the air interface on each carrier could be structured as described above by way of example, being divided over time into frames, subframes, timeslots, and symbol time segments, and over frequency into subcarriers, thus defining the array of air-interface resource elements grouped into PRBs allocable by the access node as noted above, for use to carry data to or from served UEs. 4G and 5G air-interfaces, however, might differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or different symbol time segment length than the other, and/or with one making different use of MIMO technologies than the other, among other possibilities.

In an example implementation as shown in FIG. 1, each of the access nodes 14, 16 could include an antenna structure, a remote radio head (RRH), and a baseband unit (BBU). For example, the cell site 12 could include a massive-MIMO antenna array shared by the access nodes, or each access node could have its own respective antenna array. Each access node's RRH could then include a radio and other RF circuitry defining an RF transmit chain and an RF receive chain, with components such as power amplifiers, filters, and digital-analog converters, to facilitate RF communication via the access node's antenna structure. And each access node's BBU could include processing components to facilitate baseband signal processing, general access node control, and backhaul communication.

In a representative arrangement, for instance, the example cell site 12 could include an antenna tower and an equipment room or cabinet at the base of the antenna tower. Each access node's antenna structure and RRH could be mounted on the tower. And each access node's BBU could be housed in the equipment room or cabinet and connected with the access node's RRH by a multi-fiber cable.

Further, the equipment room or cabinet could also house the cell site's CSR 18, which as noted above could provide connectivity with the core network 20. The CSR 18 could be a network router, configured to forward data packets from point to point, between the cell site 12 and entities on the core network 20, among other possibilities. As such, the CSR 18 could include multiple ports supporting physical and logical network connections with other devices.

As shown in FIG. 1, for instance, at least one port 26 of the CSR 18 could be connected by a network cable with a port 28 of the BBU of the 4G eNB 14, at least another port 30 of the CSR 18 could be connected by a network cable with a port 32 of the BBU of the 5G gNB 16, and at least another port 34 of the CSR 18 could be connected by a network cable with the core network 20 (e.g., with a neighboring router, switch, or gateway of the core network 20).

With this example arrangement, each access node has a separate respective backhaul connection through which the access node could communicate with other entities on the core network. Namely, the 4G eNB's respective backhaul connection could be the illustrated connection 36 between ports 26 and 28, and the 5G gNB's respective backhaul connection could be the illustrated connection 38 between ports 30 and 32. Note that other example arrangements could be possible as well. For instance, an access node's backhaul connection might encompass a greater extent of the communication path over which the access node would communicate on the core network. And the access nodes could be served by separate respective CSRs.

Core network 20 could be a packet-switched network, such as an Evolved Packet Core (EPC) network or Next Generation Core (NGC) network, supporting Internet Protocol (IP) communication and virtual packet tunnel interfaces between network nodes. In the example shown, the core network 20 includes a serving gateway (SGW) 40, a packet data network gateway (PGW) 42, a mobility management entity (MME) 44, and a home subscriber server (HSS) 46, although other arrangements are possible as well.

With this arrangement, each access node's BBU could have an assigned IP address on the core network 20, through the BBU's connection with the CSR 18. Each access node could then communicate with the SGW 40, the SGW 40 could communicate with the PGW 42, and the PGW 42 could provide connectivity with a transport network 48, such as the Internet. Further, each access node could communicate with the MME 44, and the MME 44 could communicate with the SGW 40, so that the MME 44 could coordinate setup of bearers for UEs to engage in packet-data communication via 4G and 5G. Alternatively, just the 4G eNB 14 might have an interface with the MME 44 and may function as an anchor for signaling with the MME 44 both for 4G service and for 5G and EN-DC service. Still further, the HSS could store UE profile records, which could specify service-subscription plans, UE configurations, and/or other such UE capability information.

FIG. 1 also depicts various example UEs 50 that may from time to time be within coverage of cell site 12 and may be served by either or both of the illustrated access nodes. Each such UE might be configured to support 4G service and/or 5G service. For instance, a UE may have a 4G LTE radio and associated RF circuitry and logic, and/or a 5G NR radio and associated RF circuitry and logic. In addition, if a UE is configured to support both 4G service and 5G service, the UE might also be configured to support EN-DC.

With this arrangement, each access node 14, 16 may from time to time serve a number of UEs with standalone connectivity according to the access node's respective RAT, with each UE's packet data communication flowing over the access node's respective backhaul connection between the access node and the core network 20. Further, the access nodes 14, 16 may also from time to time together serve a number of UEs with EN-DC, with each UE's packet data communication flowing in part over the 4G eNB's respective backhaul connection 36 and in part over the 5G gNB's respective backhaul connection 38.

As to standalone connectivity, for instance, when a UE enters into coverage of the cell site 12, the UE could initially scan for coverage on a preferred RAT, such as 4G or 5G, and the UE could thereby discover threshold strong coverage of one of the access nodes on a given carrier. For instance, the UE might discover threshold strong 4G coverage of the 4G eNB 14 on a 4G carrier 22, or the UE might discover threshold strong 5G coverage of the 5G gNB 16 on a 5G carrier 24.

The UE could then engage in RRC signaling with that access node to establish a connection under the applicable RAT on the detected carrier. And if appropriate, the UE could engage in attach signaling with the MME 44 through the UE's established RRC connection, and the MME 44 could coordinate setup for the UE of at least one user-plane bearer. For instance, the MME 44 could engage in signaling with the access node and the SGW 40 to coordinate setup for the UE of an S1-U packet tunnel between the access node and the SGW 40, the SGW 40 could responsively engage in signaling with the PGW 42 to set up for the UE a corresponding S5 packet tunnel between the SGW 40 and the PGW 42, and the access node could also responsively engage in signaling with the UE to set up a corresponding data radio bearer (DRB) over the air between the access node and the UE.

Once the UE is so connected and attached, the access node could then serve the UE with standalone connectivity in the manner described above. For instance, when the SGW 40 has data destined to the UE, the data could flow over the UE's S1-U tunnel, via the access node's respective backhaul connection, to the access node's BBU, and the access node's BBU could coordinate transmission of the data to the UE via the access node's RRH. And when the UE has data for uplink transmission and has sent a scheduling request to the access node, the access node's BBU could coordinate transmission of the data from the UE, which the access node's BBU could forward over the UE's S1-U tunnel, via the access node's respective backhaul connection, to the SGW 40.

As to EN-DC, on the other hand, once a UE has standalone connectivity with the 4G eNB 14, the 4G eNB could determine if the UE is EN-DC capable, such as by querying the UE for capabilities data or receiving UE-capabilities data provided by the HSS 46. And if the UE is EN-DC capable, the 4G eNB 14, operating as an MN, could then engage in a process as discussed above to configure EN-DC service for the UE.

For instance, the 4G eNB 14 could direct the UE to scan for coverage of the 5G gNB 16, and the UE could report detecting threshold strong of the 5G gNB 16 on a given 5G carrier 24. And the 4G eNB 14 could then engage in signaling with the 5G gNB 16 and with the UE to coordinate setup for the UE of a 5G connection on the detected 5G carrier. Further, the 4G eNB 14 could engage in signaling with the 5G gNB 16, the MME 44, and the UE, to establish a split bearer so that the 4G eNB 14 and 5G gNB 16 could then serve respective portions of the UE's data communications.

Various Split-Bearer Arrangements May Also be Possible.

In one implementation, the split bearer could be established at the SGW 40, with one bearer leg extending between the SGW 40 and the 4G eNB 14 and another bearer leg extending between the SGW 40 and the 5G gNB 16. For instance, while maintaining the UE's S1-U tunnel between the 4G eNB 14 and the SGW 40, the MME 44 could coordinate setup for the UE of another S1-U tunnel between the 5G gNB 16 and the SGW 40. With this arrangement, packet-data communications between the UE and the 4G eNB 14 could flow over the S1-U tunnel, via the 4G eNB's respective backhaul connection 36, between the 4G eNB 14 and the SGW 40, and packet-data communications between the UE and the 5G gNB 16 could flow over the S1-U tunnel, via the 5G gNB's respective backhaul connection 38, between the 5G gNB 16 and the SGW 40.

In another implementation, the split bearer could be established at the 5G gNB 16, with the UE's S1-U tunnel extending between the SGW 40 and the 5G gNB 16 and a leg of the UE's bearer extending over an X2 interface between the 5G gNB 16 and the 4G eNB 14. For instance, the MME 44 could coordinate transfer of the UE's S1-U tunnel from being between the SGW 40 and the 4G eNB 14 to instead being between the SGW 40 and the 5G gNB 16, and the 4G eNB 14 and 5G gNB 16 could coordinate setup of the bearer leg between the 4G eNB 14 and the 5G gNB 16. With this arrangement, communications between the 5G gNB 16 and the UE would flow over the UE's S1-U tunnel, via the 5G gNB's respective backhaul connection 38, between the 5G gNB 16 and the SGW 40, and communications between the 4G eNB 14 and the UE would flow between the 4G eNB 14 and the 5G gNB 16 and likewise over the UE's S1-U tunnel, via the 5G gNB's respective backhaul connection 38, between the 5G gNB 16 and the SGW 40.

And in yet another implementation, the split bearer could be established at the 4G eNB 14, with the UE's S1-U tunnel still extending between the SGW 40 and the 4G eNB 14, and with a leg of the bearer extending between the 4G eNB 14 and the 5G gNB 16. For instance, the 4G eNB 14 could maintain the S1-U tunnel between the 4G eNB 14 and the SGW 40, and the 4G eNB 14 and 5G gNB 16 could coordinate setup of a bearer leg between the 4G eNB 14 and the 5G gNB 16. With this arrangement, communications between the 4G eNB 14 and the UE could flow over the UE's S1-U tunnel, via the 4G eNB's respective backhaul connection 36, between the 4G eNB 14 and the SGW 40, and communications between the 5G gNB 16 and the UE could flow between the 5G gNB 16 and the 4G eNB 14 and likewise over the UE's S1-U tunnel, via the 4G eNB's respective backhaul connection 36, between the 4G eNB 14 and the SGW 40.

With EN-DC configured for the UE through this and/or other steps, the 4G eNB 14 and 5G gNB 16 could then concurrently serve the UE over their respective connections with the UE, each in the manner discussed above, perhaps with both providing for both downlink and uplink downlink scheduled data communication, or perhaps with both providing for downlink scheduled data communication but just the one of the access nodes providing for uplink scheduled data communication.

On the downlink, for instance, when the SGW 26 has data destined to the UE, the 4G eNB 14 could coordinate downlink transmission of some of the data over the air from the 4G eNB 14 to the UE as discussed above, and the 5G gNB 16 could coordinate downlink transmission of other of the data over the air from the 5G gNB 16 to the UE as discussed above. Likewise, when the UE has data to transmit, the UE could send to the 4G eNB 14 a scheduling request for transmission of some of the data to the 4G gNB 14, and the 4G eNB 14 could coordinate uplink transmission of that data over the air from the UE to the 4G eNB 14, and the UE could send to the 5G gNB 16 a scheduling request for transmission of other of the data to the 5, and the SN could coordinate uplink transmission of that data over the air from the UE to the SN. Or the UE could limit its uplink transmission to just one of the access nodes.

In addition, as discussed above, when either such access node is serving a given UE with standalone connectivity or as part of EN-DC, the access node could configure and provide the UE with carrier-aggregation service. In particular, as noted above, the access node could add one or more carriers to the UE's air-interface connection with the access node, perhaps updating a context record to indicate the new configuration of the connection and engaging in RRC signaling or the like to inform the UE of the new configuration as well. And the access node could then serve the UE concurrently on the multiple carriers, coordinating air-interface communication with the UE on PRBs distributed across the multiple carriers, thus helping to provide the UE within increased throughput.

As noted above, a technical problem that could arise with an example system is that an access node's respective backhaul connection could become overly congested to the point that the backhaul connection becomes a bottleneck for data communication. And as further noted above, this could be a particular issue for EN-DC service, as there may be an expectation that UEs served with EN-DC will receive especially high aggregate throughput.

In the example arrangement of FIG. 1, for instance, the 4G eNB's respective backhaul connection 36 could become threshold heavily loaded, which could pose an issue for a UE served with EN-DC by the 4G eNB 14 and the 5G gNB 16. Namely, the high load on backhaul connection 36 may unduly restrict flow of the UE's packet data between the 4G eNB 14 and the core network 20, which may in turn unduly restrict the UE's 4G throughput as part of the UE's EN-DC service. Likewise, the 5G gNB's respective backhaul connection 38 could become threshold heavily loaded, which could also pose an issue for a UE served with EN-DC by the 4G eNB 14 and the 5G gNB 16. Namely, the high load on backhaul connection 38 may unduly restrict flow of the UE's packet data between the 5G gNB 16 and the core network 20, which may in turn unduly restrict the UE's 5G throughput as part of the UE's EN-DC service.

As further noted above, the present disclosure provides for addressing this or related issues by detecting that an access node's respective backhaul connection is threshold heavily loaded and, in response, having the other access node suppress the extent of carrier-aggregation service that the other access node would provide to standalone-connected UEs.

For example, this could involve detecting that the 4G eNB's respective backhaul connection 36 is threshold highly loaded and responsively causing the 5G gNB 16 to suppress the extent of carrier-aggregation service that the 5G gNB 16 provides to UEs served with standalone 5G connectivity. Or it could involve detecting that the 5G gNB's respective backhaul connection is threshold highly loaded and responsively causing the 4G eNB 14 to suppress the extent of carrier-aggregation service that the 4G eNB 14 provides to UEs served with standalone 4G connectivity.

Optimally in this process, the access node that suppresses the extent of carrier-aggregation service that it provides could thus draw a distinction between any UEs that the access node is serving with standalone connectivity and any UEs that the access node is serving as part of EN-DC. Namely, the access node could suppress the extent of carrier-aggregation service as to any standalone-connected UEs, and the access node could more liberally allow (e.g., not restrict) carrier-aggregation service as to any UEs served with EN-DC.

In practice, the act of suppressing carrier-aggregation service as to standalone-connected UEs could take various forms, generally serving the purpose of blocking, limiting, or otherwise restricting such service.

By way of example, suppressing the extent of carrier-aggregation service as to standalone-connected UEs could involve de-configuring carrier aggregation for one or more UEs having standalone connectivity with the access node. For instance, as to each of one or more UEs that the access node is serving with standalone connectivity and carrier aggregation, the access node could update records and engage in RRC signaling or the like to re-configure the UE's air-interface connection to be on just a single carrier instead of being on multiple carriers.

As another example, suppressing the extent of carrier-aggregation service as to standalone-connected UEs could involve blocking setup of carrier-aggregation for one or more UEs having standalone connectivity with the access node. For instance, the access node could transition from a mode in which the access node allows setup of carrier-aggregation service for standalone-connected UEs to a mode in which the access node does not allow setup of carrier-aggregation service for standalone-connected UEs. Thus, when serving a UE with standalone connectivity, per this setting, the access node could forgo configuring carrier-aggregation service for the UE.

As yet another example, suppressing the extent of carrier-aggregation service as to standalone-connected UEs could involve starting to impose a stringent maximum limitation on the number of carriers in the connection of any UE having standalone connectivity with the first access node. For instance, the access node could transition from a mode in which the access node limits the number of carriers in each such connection to a maximum of three to a mode in which the access node limits the number of carriers in each such connection a maximum of two.

And as yet another example, suppressing the extent of carrier-aggregation service as to standalone-connected UEs could involve starting to impose a stringent maximum limitation on the number of such UEs that that the access node would serve concurrently with carrier aggregation. For instance, the access node could transition from a mode in which the access node does not impose such a limit to a mode in which the access node imposes such a limit.

Other examples are possible as well.

In the arrangement of FIG. 1, this process could be carried out by one or both of the access nodes and/or by another computing system, such as an element management system (not shown).

By way of example, a given one of the access nodes could determine when the level of load on its own respective backhaul connection becomes threshold high and, in response to that determination, could transmit to the other access node a signaling message to which the other access node is configured to respond by suppressing the extent of carrier-aggregation service that it provides to standalone-connected UEs. Alternatively, an access node could regularly determine the level of load on its respective backhaul connection and report that load level to the other access node, and the other access node could be configured to determine when the reported level of load is threshold high and to responsively suppress the extent of carrier-aggregation service that it provides to standalone-connected UEs.

In practice, an access node could determine when its respective backhaul connection is threshold heavily loaded by monitoring its own data communication on the backhaul connection and/or by receiving from a backhaul node or other entity a report related to the backhaul load. Further, at issue here could be a rate of data flow on the backhaul, a rate of packets dropped on the backhaul connection, an extent of data buffered waiting to be transmitted over the backhaul connection, and/or one or more other metrics that could indicate a backhaul bottleneck condition.

In the arrangement of FIG. 1, for instance, the BBU of a given access node could monitor the rate of its data transmission or reception over its respective backhaul connection with the CSR 18 and could determine when that data rate becomes at least as high as a predefined threshold data rate deemed to be problematic, perhaps a threshold that is set based on the physical or configured maximum capacity of the CSR port with which it is connected. Alternatively, the access node's BBU could monitor the rate of packet loss for transmission or reception over its respective backhaul connection with the CSR 18 and/or the extent of data buffered for such transmission and could determine when that packet loss rate or buffer level becomes at least as high as a predefined threshold deemed to be problematic. Still alternatively, the CSR 18 might monitor such data flow, packet loss, and/or buffer fullness and might report to the access node or directly to the other access node.

When load of the respective backhaul connection of a given one of the access nodes becomes threshold high, the other access node could thus begin suppressing the extent of carrier-aggregation service that the other access node provides to standalone-connected UEs. Further, this suppression of carrier-aggregation service could be temporary. For instance, the other access node could automatically revert to a default mode of operation after expiration of a predefined time period or upon a determination that the backhaul load condition no longer exists.

Figure 2:
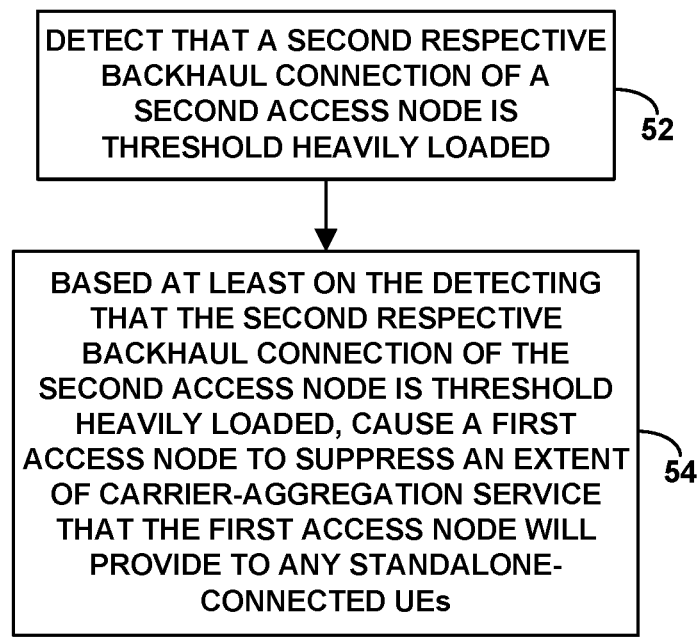
FIG. 2 is a flow chart depicting an example method in accordance with the disclosure.

FIG. 2 is next a flow chart depicting an example method that could be carried out in accordance with the present disclosure, to control carrier aggregation in a wireless communication system including a first access node and a second access node, where the first access node has a first respective backhaul connection, where the second access node has a second respective backhaul connection, where the first access node supports serving UEs with standalone connectivity, and where the first and second access nodes cooperatively support serving UEs with dual connectivity.

As shown in FIG. 2, at block 52, the method includes detecting that the second respective backhaul connection of the second access node is threshold heavily loaded. And at block 54, the method includes, based at least on the detecting that the second respective backhaul connection of the second access node is threshold heavily loaded, causing the first access node to suppress an extent of carrier-aggregation service that the first access node will provide to any standalone-connected UEs.

In line with the discussion above, the first and second access nodes could be disposed at a cell site that includes a CSR for providing connectivity between the access nodes and a core network. And the first respective backhaul connection could extend between the first access node and the CSR, and the second respective backhaul connection could extend between the second access node and the CSR. Further, the second respective backhaul connection could be separate from the first respective backhaul connection, not encompassing the first respective backhaul connection.

Further, as discussed above, the act of detecting that the second respective backhaul connection is threshold heavily loaded could take various forms, including for instance detecting that a rate of data flow between the second access node and the CSR is threshold high, detecting that a rate of packet loss for communication between the second access node and the CSR is threshold high, and/or detecting that a quantity of data buffered for transmission over the second respective backhaul connection is threshold high. Here, the detecting could be based on comparison with one or more defined threshold levels deemed to represent high load.

In addition, as discussed above, the detecting could be carried out by the second access node (e.g., by the second access node monitoring or being informed of the load level), and the method could additionally involve the second access node notifying the first access node of the detecting and the first access node causing itself to carry out the suppressing based on the notification from the second access node.

As further discussed above, the act of suppressing the extent of carrier-aggregation service that the first access node provides for any standalone-connected UEs could also take various forms, such as de-configuring carrier-aggregation for one or more UEs having standalone connectivity with the first access node, blocking setup of carrier aggregation for one or more UEs having standalone connectivity with the first access node, transitioning to impose a maximum limitation (e.g., a new, stronger maximum limitation) on quantity of carriers in a connection respectively of each of one or more UEs having standalone connectivity with the first access node, and/or transitioning to impose a maximum limitation (e.g., a new, stronger maximum limitation) on quantity of standalone-connected UEs that the first access node would serve with carrier aggregation at the same time as each other.

In addition, as discussed above, the act of the first access node suppressing the extent of carrier-aggregation service that the first access node will provide to any standalone-connected UEs could involve the first access node applying the suppressing as to standalone-connected UEs and not as to dual-connected UEs.

And as noted above, the first access node could provide service according to a first RAT, and the second access node could provide service according to a second RAT different than the first RAT. For instance, one might provide service according to 4G LTE, and the other might provide service according to 5G NR.

Figure 3:
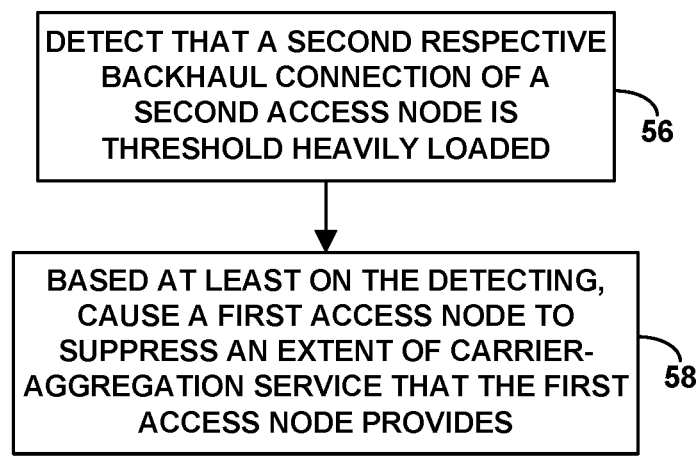
FIG. 3 is another flow chart depicting an example method in accordance with the disclosure.

FIG. 3 is next another flow depicting a method for controlling carrier aggregation, the method being operable in a wireless communication system in which a first access node has a first respective backhaul connection and a second access node has a separate second respective backhaul connection. As shown in FIG. 3, at block 56, the method includes detecting that the second respective backhaul connection of the second access node is threshold heavily loaded. And at block 58, the method includes, based at least on the detecting, causing the first access node to suppress an extent of carrier-aggregation service that the first access node provides. Without limitation, for instance, the method could include, based at least on the detecting, causing the first access node to suppress an extent of carrier-aggregation service that the first access node provides specifically to standalone-connected UEs.

Various other features discussed herein can be implemented in this context as well, and vice versa.

Figure 4:
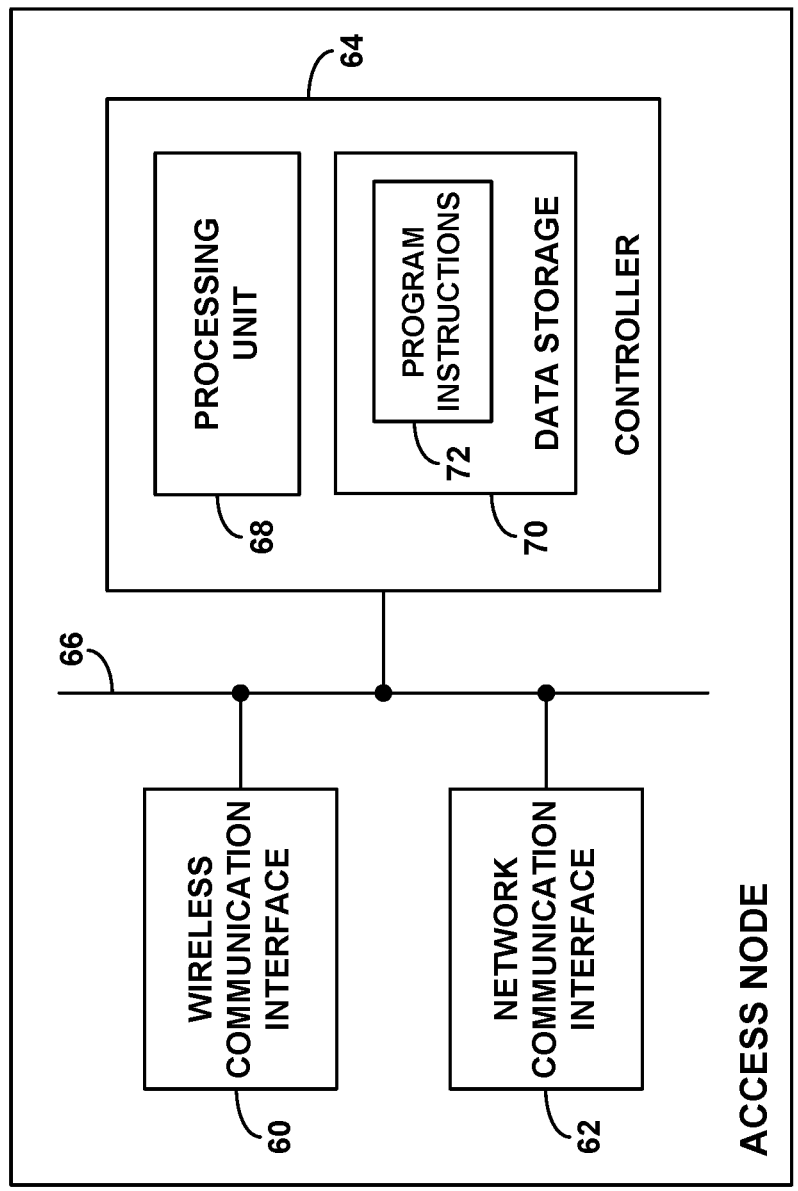
FIG. 4 is a simplified block diagram of an example access node operable in accordance with the disclosure.

FIG. 4 is next a simplified block diagram of an example access node that could operate in accordance with the present disclosure. This access node could be one of those shown in FIG. 1, among other possibilities. As shown, the example access node includes a wireless communication interface 60 a network communication interface 62, and a controller 64, all of which could be communicatively linked together by a system bus, network, or other connection mechanism 66.

In this example access node, the wireless communication interface 60 could comprise an antenna structure, which could be tower mounted or could take other forms, and associated components such as a power amplifier and a wireless transceiver, so as to facilitate providing a coverage area defining an air interface having a downlink and an uplink through which to serve one or more UEs, and engaging in transmission and reception of user-plane data and control-plane signaling over the air interface. And the network communication interface 62 could comprise a wired or wireless interface, such as an Ethernet network communication interface, through which to engage in backhaul communication with other entities.

Further, controller 64 could comprise at least one processing (e.g., one or more general purpose processors and/or specialized processors) 68 programmed to cause the access node to carry out various operations such as those discussed herein. For instance, the controller 64 could comprise at least one non-transitory data storage (e.g., one or more magnetic, optical, or flash storage components) 70 holding program instructions 72 executable by the at least one processing unit 68 to cause the access node to carry out such operations.

Various other features discussed herein can be implemented in this context as well, and vice versa.

In line with the discussion above, the present disclosure also contemplates a wireless communication system configured to control MCS used for air-interface communication. Such a system could include a first access node disposed at a cell site and configured to provide first coverage in which to serve UEs, a second access node disposed at the cell site and configured to provide second coverage in which to serve UEs (e.g., the same or other UEs), and a CSR providing backhaul connectivity between the cell site and a core network. And as discussed above, the first access node could be configured to respond to at least threshold high backhaul load at the CSR by causing the second access node to suppress MCS of air-interface communication that the second access node schedules in the second coverage.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control carrier aggregation in a wireless communication system including a first access node and a second access node, wherein the first access node has a first respective backhaul connection, wherein the second access node has a second respective backhaul connection, wherein the first access node supports serving user equipment devices (UEs) with standalone connectivity, and wherein the first and second access nodes cooperatively support serving UEs with dual connectivity, the method comprising:
   detecting that the second respective backhaul connection of the second access node is threshold heavily loaded; and
   based at least on the detecting that the second respective backhaul connection of the second access node is threshold heavily loaded, causing the first access node to suppress an extent of carrier-aggregation service that the first access node will provide to any standalone-connected UEs.

2. The method of claim 1, wherein the first and second access nodes are disposed at a cell site, the cell site including a cell site router (CSR) that provides connectivity between the access nodes and a core network, wherein the first respective backhaul connection extends between the first access node and the CSR, and wherein the second respective backhaul connection extends between the second access node and the CSR.

3. The method of claim 2, wherein the second respective backhaul connection is separate from and does not encompass the first respective backhaul connection.

4. The method of claim 2, wherein detecting that the second respective backhaul connection of the second access node is threshold heavily loaded comprises detecting that a rate of data flow between the second access node and the CSR is threshold high.

5. The method of claim 2, wherein detecting that the second respective backhaul connection of the second access node is threshold heavily loaded comprises detecting that a rate of packet loss for communication between the second access node and the CSR is threshold high.

6. The method of claim 2, wherein detecting that the second respective backhaul connection of the second access node is threshold heavily loaded comprises detecting that a quantity of data buffered for transmission over the second respective backhaul connection is threshold high.

7. The method of claim 1, wherein the detecting is carried out by the second access node, the method further comprising the second access node notifying the first access node of the detecting, and wherein the causing is carried out by the first access node responsive to the notifying.

8. The method of claim 1, wherein suppressing the extent of carrier-aggregation service that the first access node provides for any standalone-connected UEs comprises deconfiguring carrier-aggregation for one or more UEs having standalone connectivity with the first access node.

9. The method of claim 1, wherein suppressing the extent of carrier-aggregation service that the first access node provides for any standalone-connected UEs comprises blocking setup of carrier aggregation for one or more UEs having standalone connectivity with the first access node.

10. The method of claim 1, wherein suppressing the extent of carrier-aggregation service that the first access node provides for any standalone-connected UEs comprises transitioning to impose a maximum limitation on quantity of carriers in a connection respectively of each of one or more UEs having standalone connectivity with the first access node.

11. The method of claim 1, wherein suppressing the extent of carrier-aggregation service that the first access node provides for any standalone-connected UEs comprises transitioning to impose a maximum limitation on quantity of standalone-connected UEs that the first access node would serve concurrently with carrier aggregation.

12. The method of claim 1, wherein the first access node suppressing the extent of carrier-aggregation service that the first access node will provide to any standalone-connected UEs comprises the first access node applying the suppressing as to standalone-connected UEs and not as to dual-connected UEs.

13. The method of claim 1, wherein the first access node provides service according to a first radio access technology (RAT), and wherein the second access node provides service according to a second RAT.

14. A wireless communication system configured to control carrier aggregation, the wireless communication system comprising:
   a first access node disposed at a cell site and configured to provide first coverage in which to serve user equipment devices (UEs);
   a second access node disposed at the cell site and configured to provide second coverage in which to serve UEs, wherein the first and second access nodes cooperatively support serving UEs with dual connectivity; and
   a cell site router (CSR) providing connectivity between the cell site and a core network, wherein the first access node has a first respective backhaul connection between the first access node and the CSR and wherein the second access node has a second respective backhaul connection between the second access node and the CSR,
   wherein the first access node is configured to respond to at least detected threshold high backhaul load on the second respective backhaul connection of the second access node by suppressing an extent of carrier aggregation that the first access node provides to any UEs having standalone connectivity with the first access node.

15. The wireless communication system of claim 14, wherein the second access node is configured to detect the threshold high backhaul load on the second respective backhaul connection and to notify the first access node of the detected threshold high backhaul load on the second respective backhaul connection.

16. The wireless communication system of claim 15, wherein detecting the threshold high backhaul load on the second respective backhaul connection is based on a factor selected from the group consisting of data flow on the second respective backhaul connection, packet loss rate on the second respective backhaul connection, and buffering of data for transmission over the second respective backhaul connection.

17. The wireless communication system of claim 14, wherein suppressing the extent of carrier aggregation that the first access node provides to any UEs having standalone connectivity with the first access node comprises an operation selected from the group consisting of:
- de-configuring carrier-aggregation for one or more UEs having standalone connectivity with the first access node,
- blocking setup of carrier aggregation for one or more UEs having standalone connectivity with the first access node,
- imposing a maximum limitation on quantity of carriers in a connection respectively of each of one or more UEs having standalone connectivity with the first access node, and
- imposing a maximum limitation on quantity of standalone-connected UEs that the first access node would serve concurrently with carrier aggregation.

18. The wireless communication system of claim 14, wherein the suppressing the extent of carrier-aggregation service that the first access node provides to any UEs having standalone connectivity with the first access node comprises applying the suppressing as to any standalone-connected UEs and not as to any dual-connected UEs.

19. The wireless communication system of claim 14, wherein the first access node provides service according to a first radio access technology (RAT), and wherein the second access node provides service according to a second RAT.

* * * * *